US011940018B2

(12) United States Patent
Häßler et al.

(10) Patent No.: US 11,940,018 B2
(45) Date of Patent: Mar. 26, 2024

(54) TORSIONAL VIBRATION DAMPER

(71) Applicant: Schaeffler Technologies AG & Co. KG, Herzogenaurach (DE)

(72) Inventors: Martin Häßler, Graben-Neudorf (DE); Alain Rusch, Gambsheim (FR); Philippe Kremper, Strasbourg (FR); Yannick Strub, Roeschwoog (FR); Laurent Theriot, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 494 days.

(21) Appl. No.: 17/041,569

(22) PCT Filed: Mar. 18, 2019

(86) PCT No.: PCT/DE2019/100241
§ 371 (c)(1),
(2) Date: Sep. 25, 2020

(87) PCT Pub. No.: WO2019/196979
PCT Pub. Date: Oct. 17, 2019

(65) Prior Publication Data
US 2021/0018046 A1    Jan. 21, 2021

(30) Foreign Application Priority Data
Apr. 10, 2018   (DE) .......................... 102018108435.8

(51) Int. Cl.
*F16D 3/12*     (2006.01)
*F16D 3/14*     (2006.01)
(Continued)

(52) U.S. Cl.
CPC ................. *F16D 3/12* (2013.01); *F16D 3/14* (2013.01); *F16F 15/1215* (2013.01);
(Continued)

(58) Field of Classification Search
CPC .......... F16D 3/12; F16D 3/14; F16D 2300/22; F16F 15/1215; F16F 15/12353;
(Continued)

(56) References Cited

U.S. PATENT DOCUMENTS

| RE15,645 | E * | 7/1923 | Tibbetts ................ F16F 15/129 |
|---|---|---|---|
| | | | 74/574.2 |
| 2013/0231195 | A1 | 9/2013 | Takenaka | |

FOREIGN PATENT DOCUMENTS

| CN | 1137002 A | 12/1996 |
|---|---|---|
| CN | 103080599 A | 5/2013 |

(Continued)

*Primary Examiner* — Greg Binda

(57) ABSTRACT

A torsional vibration damper includes an input part for introducing a torque, two intermediate elements, an energy storage element designed as a compression spring that acts on the intermediate elements, an output part for discharging a vibration-damped torque, and an elastic or resilient compensation part provided between the output part and the intermediate elements. The intermediate elements are designed as pendulum rockers and are movement-coupled to the input part. Each of the intermediate elements can move towards and away from the other in a linear motion. The output part is movement-coupled to the intermediate elements and rotatable relative to the intermediate elements. The compensation part is for eliminating play of the intermediate elements relative to the output part in an axial direction.

10 Claims, 4 Drawing Sheets

(51) Int. Cl.
*F16F 15/121* (2006.01)
*F16F 15/123* (2006.01)
*F16F 15/129* (2006.01)
*F16F 15/131* (2006.01)

(52) U.S. Cl.
CPC ...... *F16F 15/12353* (2013.01); *F16F 15/129* (2013.01); *F16F 15/13128* (2013.01); *F16D 2300/22* (2013.01); *F16F 2232/02* (2013.01); *Y10T 74/2128* (2015.01); *Y10T 74/213* (2015.01)

(58) Field of Classification Search
CPC ............... F16F 15/129; F16F 15/13128; F16F 2232/02; Y10T 74/2128; Y10T 74/213
USPC .................................. 464/68.2, 68.4, 68.41
See application file for complete search history.

(56) References Cited

FOREIGN PATENT DOCUMENTS

| | | |
|---|---|---|
| CN | 103119324 A | 5/2013 |
| CN | 105324589 A | 2/2016 |
| CN | 106461012 A | 2/2017 |
| DE | 102011014939 A1 | 10/2011 |
| DE | 102014206494 A1 | 10/2014 |
| DE | 102014210685 A1 | 12/2014 |
| DE | 102014211711 A1 | 12/2015 |
| DE | 102015211899 A1 | 12/2016 |
| JP | S6384777 U | 6/1988 |
| JP | H025633 U | 1/1990 |
| WO | 2018215018 A1 | 11/2018 |
| WO | 2019192645 A1 | 10/2019 |
| WO | 2019196984 A1 | 10/2019 |

* cited by examiner

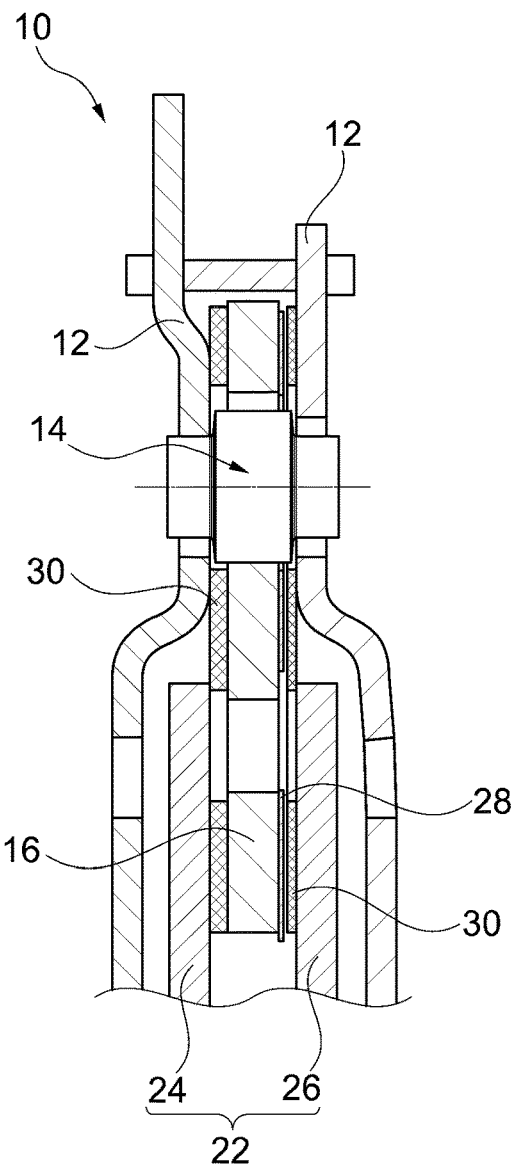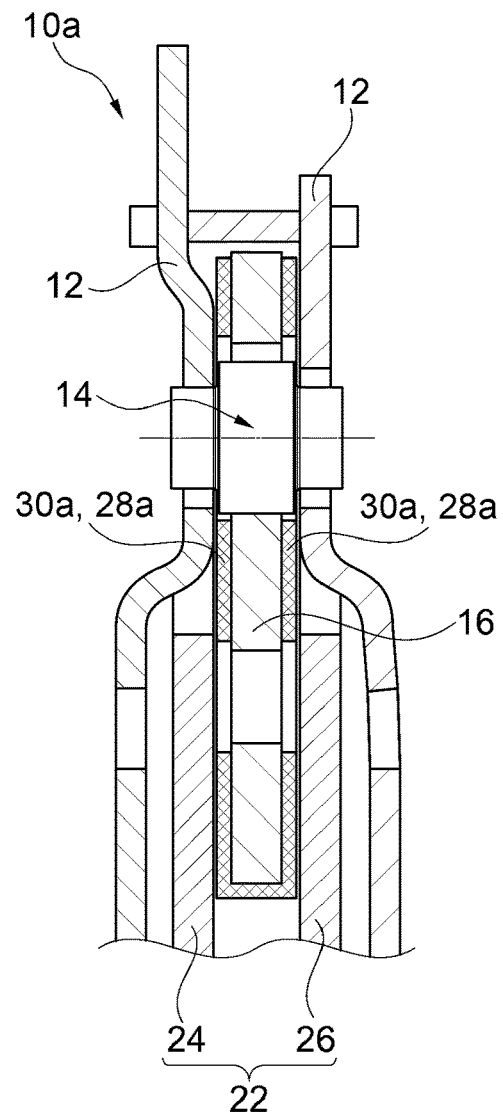
Fig. 2   Fig. 3
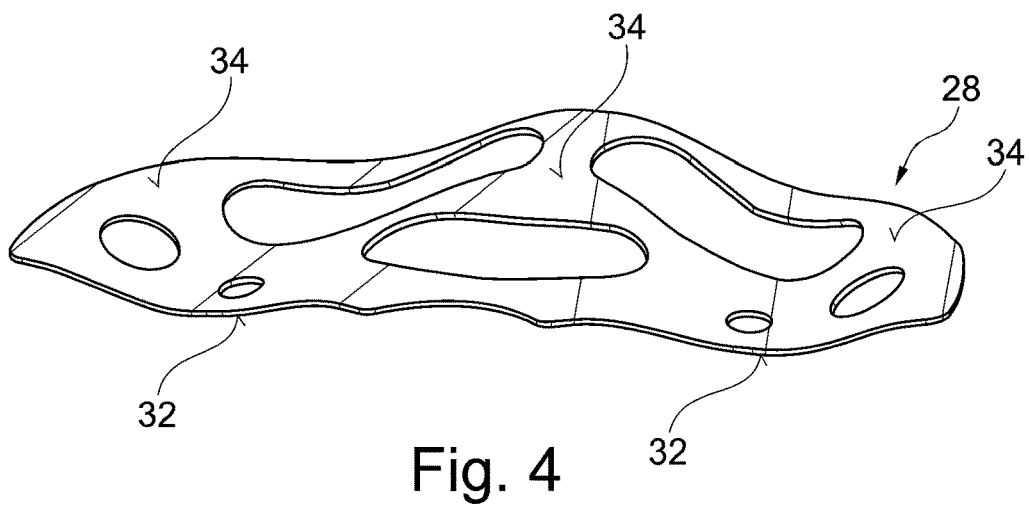
Fig. 4

TORSIONAL VIBRATION DAMPER

CROSS-REFERENCE TO RELATED APPLICATIONS

This application is the United States National Phase of PCT Appln. No. PCT/DE2019/100241 filed Mar. 18, 2019, which claims priority to German Application No. DE102018108435.8 filed Apr. 10, 2018, the entire disclosures of which are incorporated by reference herein.

TECHNICAL FIELD

The disclosure relates to a torsional vibration damper, with the help of which torsional vibrations in a powertrain of a motor vehicle can be damped.

BACKGROUND

DE 10 2015 211 899 A1 discloses a torsional vibration damper designed as a pendulum rocker damper, in which, when an input part is rotated via a first cam mechanism, opposite intermediate elements designed as a pendulum rocker are linearly displaced relative to one another in order to compress and/or relax compression springs acting on the intermediate elements. The spring force of the compression springs is supported on an output part via a second cam mechanism acting on the intermediate elements, in order to discharge a vibration-damped torque.

SUMMARY

According to the disclosure, a torsional vibration damper, e.g., a pendulum rocker damper, is provided, having an input part for introducing a torque and two movement-coupled intermediate elements designed, for example, in the form of a pendulum rocker and coupled with the input part. The intermediate elements are movable towards one another and/or away from one another in a linear motion. The torsional vibration damper also includes at least one intermediate element which acts on the intermediate elements and is designed, for example, as a compression spring, an output part that is motion-coupled to the intermediate elements and rotatable relative to the intermediate elements for discharging a vibration-damped torque, and at least one, e.g., elastic and/or resilient, compensation part, which is provided between the output part and the intermediate elements to eliminate axial play of the intermediate elements relative to the output part.

The intermediate elements are linearly movable in a radial plane of the torsional vibration damper. As a result of this mobility, it is possible for the intermediate elements, for example in the event of a suddenly occurring force, to tilt with the play and/or installation tolerances provided. In the tilted position, the intermediate elements can strike and slide along components provided next to the intermediate elements in the axial direction, e.g., the output part. This leads to a friction impairing the movement of the intermediate elements and the output part, which also occurs spontaneously and at unpredictable times. However, axial play of the intermediate elements, for example relative to the output part, can be eliminated by the at least one compensation part. Tilting with unpredictable frictional braking effects on the intermediate elements and/or on the output part can thereby be prevented.

However, since the intermediate elements execute a relative movement with respect to the output part, a sliding frictional contact caused by the compensation part cannot be avoided. In this case, however, the disclosure exploits the fact that the energy storage elements, which are designed, for example, as compression springs, together with the intermediate elements and the coupled input part and output part, form an oscillatory mass-spring system which is usually operated in a supercritical mode. For example, when starting a motor vehicle, in the powertrain of which the torsional vibration damper designed as a pendulum rocker damper is provided, it can happen that the torsional vibration damper has to pass through its resonance speed. Due to the sliding frictional contact caused by the compensation part, a deliberate frictional damping can be provided, which can dampen a resonance-induced build-up of torsional vibrations in the torsional vibration damper, which enables good torsional vibration damping in a powertrain of a motor vehicle.

The unavoidable frictional damping caused by the compensation part even has the positive effect that unnecessary resonance-induced torsional vibrations can be avoided. However, this damping, which is generally rather insignificant, does not occur spontaneously and unpredictably, but occurs constantly and in a planned manner, so that this damping can be considered when designing the vibration properties of the torsional vibration damper. A brief, spontaneous and unforeseen detuning of the vibrational properties of the torsional vibration damper can thereby be avoided. The compensation part can be used to replace spontaneous and unpredictable friction effects by a constant, frictional damping which is considered in the design of the vibrational properties of the torsional vibration damper, thus enabling good torsional vibration damping in a powertrain of a motor vehicle.

The output part may have a first output disc and a second output disc coupled to the first output disc in a rotationally fixed manner. The intermediate elements may be arranged in the axial direction between the first output disc and the second output disc, and the at least one compensating part may be arranged in the axial direction between the first output disc and the intermediate elements and/or between the intermediate elements and the second output disc. This makes it possible to provide a compensation part on both axial sides of the respective intermediate element, which provides frictional damping when the respective intermediate element moves relative to the two output disks. The compensation parts provided on both axial sides of the intermediate element can centre the intermediate element between the first output disc and the second output disc, for example, at an equal distance from the respective output disc, so that even if the intermediate element tilts out of the radial plane of the torsional vibration damper, unpredictable striking of the intermediate element against the output part can be avoided.

The compensation part may be designed as a pre-tensioned spring, e.g., a plate spring or corrugated sheet. As a result, the compensation part can be supported indirectly or directly on the intermediate element on one axial side and indirectly or directly on the output part on the other axial side, in order to eliminate the axial play of the intermediate element. This allows an internal friction of the compensation part to be minimized. In addition, the compensation part can have a very small axial extent, so that the compensation part can be installed essentially in a space-neutral manner without significantly increasing the axial extent of the torsional vibration damper.

If the compensation part is designed as a plate spring, it is possible that the compensation part is designed to extend circumferentially in the circumferential direction and can act on both intermediate elements. If the compensation part is designed as a corrugated sheet metal piece, it is possible that the compensation part designed as corrugated sheet metal only extends in the circumferential direction as far as is necessary for the axial support of the respective intermediate element on the output part. As a result, the compensation part designed as corrugated sheet metal can be provided for each intermediate element and extends in the circumferential direction only over a limited angular range, essentially tangentially, for example.

The compensation part may be fastened to the output part in a rotationally fixed manner. The compensation part is thereby rotatably fixed, at a defined constant nominal radius to the output part, in the circumferential direction relative to the intermediate element. As a result, the compensation part does not have to participate in the linear relative movement in the radial plane of the torsional vibration damper, which allows the compensation part to be designed essentially rotationally symmetrical. This avoids unnecessary imbalances.

The compensation part may act indirectly on the intermediate elements or on the output part via a friction element. The friction properties (e.g., friction coefficient) of the friction element, designed as a friction ring, for example, can provide a certain amount of desired friction-related damping. It is not necessary to provide the compensation part with specific friction properties. Since, as a rule, only a small amount of frictional damping is required, the friction element can, for example, provide a comparatively low coefficient of friction, so that the friction element can better be designed as a slide ring.

The intermediate element may be provided with a friction element on at least one axial side facing the compensation part, the intermediate element being largely shrouded by the friction element, for example. The friction element can be designed, for example, as a coating or shell or sleeve. This facilitates the attachment of the friction element to the intermediate element. The frictional damping can be achieved by the compensation part sliding along the friction element.

The friction element may be designed as a two-part sleeve for covering a large area of the intermediate element. The friction element may cover the axial sides of the intermediate element, e.g., essentially completely. If the intermediate element, together with the friction element, executes a linear relative movement in the radial plane of the torsional vibration damper with respect to the compensation part, while the compensation part together with the output part executes a relative movement in the circumferential direction with respect to the intermediate element, the superimposed relative movements can result in a larger surface area in which the compensation part can engage the intermediate element, e.g., with a spring force. Due to the large-area coverage of the intermediate part with the friction element, a similar friction can be achieved at an almost arbitrary relative position.

To form the compensation part, the friction element may be designed to be elastic and/or resilient in the axial direction. The elastic resilience of the friction element makes it possible to compensate for the axial play of the intermediate element and thereby to form the compensation part itself. At the same time, the elastically compressed friction element can provide a spring force with which the friction element presses against the output part and provides friction for frictional damping.

The compensation part may be supported, on the one hand, on the intermediate element and, on the other hand, both on the output element and on the input element. The input element may have a first input disc and a second input disc coupled in a rotationally fixed manner to the first input disc, and the intermediate elements may be arranged in the axial direction between the first input disc and the second input disc.

The output part and the input part can have a different extent in the radial direction. This makes it possible, for example, for the output part to be provided with its output discs radially on the inside and for the input part to overlap the output discs with its input discs radially on the outside. This allows both the input part and the output part to engage the intermediate element in order to induce the desired movement coupling, for example, via interposed cam mechanisms, with a conversion between a rotary movement of the input part and the output part with the linear movement of the intermediate elements. This enables the intermediate elements to be supported in the axial direction in an inner, first radius range on the output part and in an outer, second radius range on the input part, for example.

The compensation part can be axially supported not only in the first radius range but also in the second radius range, which enables tilting of the intermediate elements to be avoided to an even better degree. In this case, the compensation part may be implemented by a friction element of the intermediate part that is designed to be elastic and/or resilient in the axial direction.

The intermediate elements may be coupled to the input part via a first cam mechanism in such a way that a relative rotation of the input part relative to the intermediate elements is convertible into a linear movement of the intermediate element towards one another and/or away from one another. The output part may be coupled to the intermediate elements via a second cam mechanism in such a way that a relative linear movement of the intermediate elements to one another is convertible into a rotary movement of the output part relative to the intermediate elements. The movement coupling of the input part with the intermediate elements and/or the movement coupling of the output part with the intermediate elements can take place, for example, via cam mechanisms, which can be designed as shown in DE 10 2015 211 899 A1, the content of which is hereby incorporated by reference as part of the disclosure.

The disclosure further relates to a coupling disc for a friction clutch, which can be provided in the powertrain of a motor vehicle, having a torsional vibration damper which can be designed and developed as described above, for damping torsional vibrations. For example, friction linings can be fastened to the input part of the torsional vibration damper and can be pressed between a pressure plate and a counter plate of the friction clutch in a frictionally engaged manner in order to transmit a torque to the coupling disc. The compensation part in the torsional vibration damper can be used to replace spontaneous and unpredictable friction effects by a constant, frictional damping which is taken into account in the design of the vibrational properties of the torsional vibration damper, thus enabling good torsional vibration damping in a powertrain of a motor vehicle.

The disclosure further relates to a friction clutch for producing and/or interrupting a torque transmission in a powertrain of a motor vehicle. The friction clutch may include counter plate for introducing a torque from a drive shaft of a motor vehicle engine, a coupling disc, designed and developed as described above, for discharging the torque to a transmission input shaft of a motor vehicle transmission, and a pressure plate which can be displaced axially relative to the counter plate for pressing the coupling disc between the counter plate and the pressure plate in a frictionally engaged manner. The compensation part in the torsional vibration damper can be used to replace spontaneous and unpredictable friction effects by a constant, frictional damping which is taken into account in the design of the vibrational properties of the torsional vibration damper, thus enabling good torsional vibration damping in a powertrain of a motor vehicle.

The disclosure further relates to a powertrain of a motor vehicle, e.g., an electrically drivable motor vehicle, with a flywheel drivable by an internal combustion engine and/or an electrical machine, and a torsional vibration damper connected directly or indirectly to the flywheel. The torsional vibration damper can be designed and developed as described above, for damping torsional vibrations, and connected directly or indirectly to a transmission input shaft of a motor vehicle transmission. The compensation part in the torsional vibration damper can be used to replace spontaneous and unpredictable friction effects by a constant, frictional damping which is taken into account in the design of the vibrational properties of the torsional vibration damper, thus enabling good torsional vibration damping in a powertrain of a motor vehicle.

BRIEF DESCRIPTION OF THE DRAWINGS

In the following, the disclosure is explained by way of example with reference to the attached drawings using exemplary embodiments, the features shown below being able to represent an aspect of the disclosure both individually and in combination. In the figures:

FIG. 2 shows a schematic sectional view of the torsional vibration damper from FIG. 1 along a sectional plane A-A, FIG. 3 shows a schematic sectional view of an alternative embodiment of the torsional vibration damper from FIG. 1 along a sectional plane A-A, FIG. 4 shows a schematic perspective view of a compensation part.

DETAILED DESCRIPTION

Figure 1:
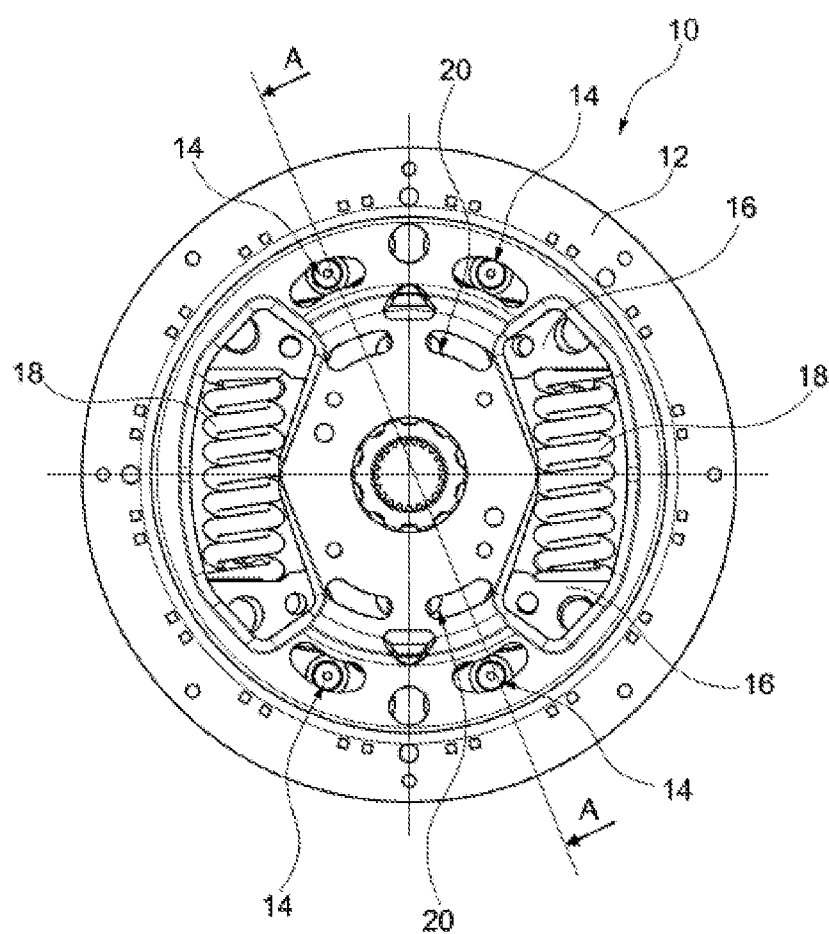
FIG. 1 shows a schematic plan view of a torsional vibration damper.
Figure 5:
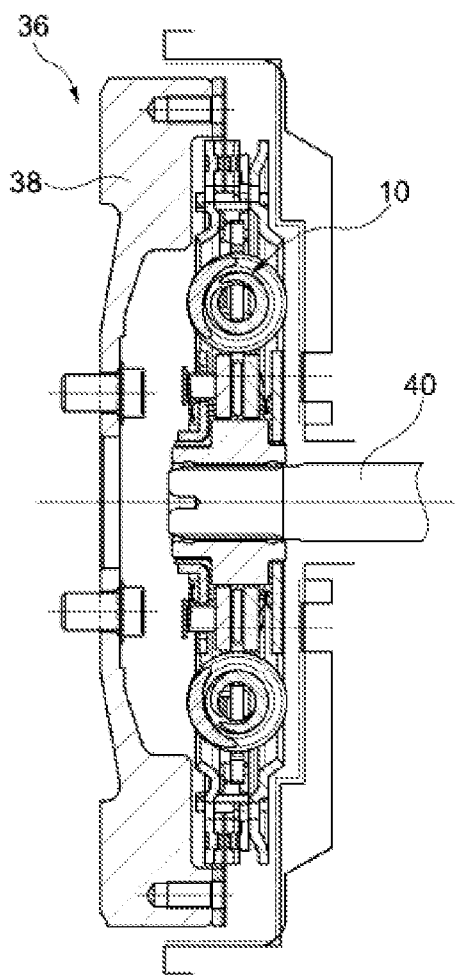
FIG. 5 shows a schematic sectional view of part of a powertrain.
Figure 6:
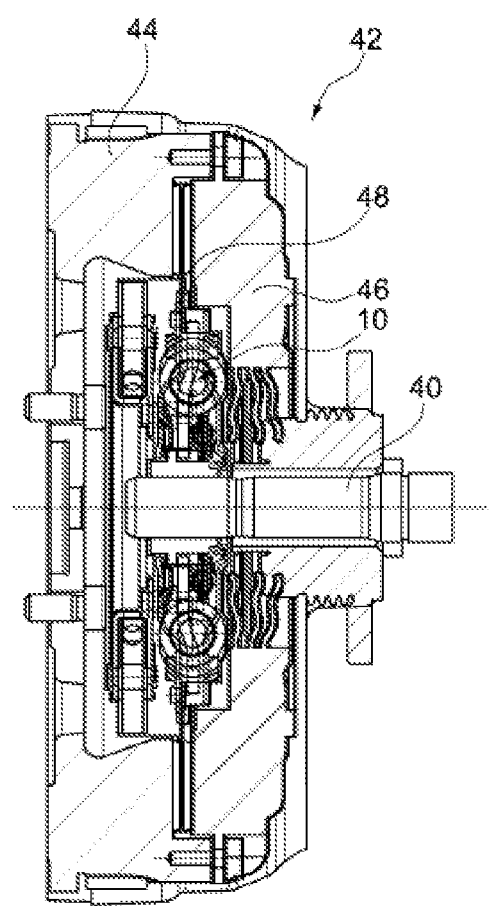
FIG. 6 shows a schematic sectional view of a friction clutch.
Figure 7:
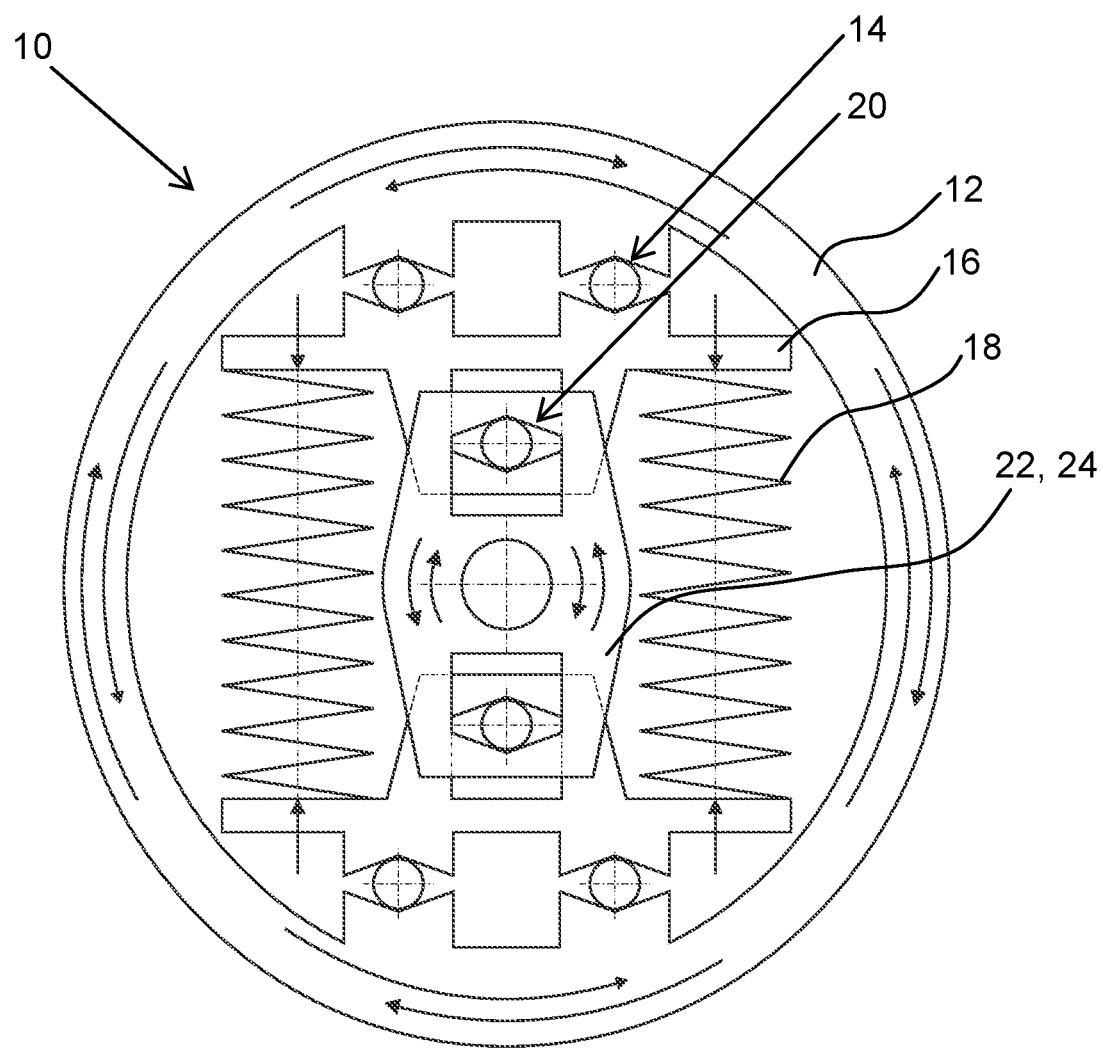
FIG. 7 shows a schematic plan view of the torsional vibration damper from FIG. 1 with an input part and a compensation part removed for clarity.

The torsional vibration damper 10 shown in FIG. 1, FIG. 2, and FIG. 7, designed as a pendulum rocker damper, has an input part 12 which is composed of two outer input disks and can be part of a coupling disk 48 of a friction clutch 42 in a powertrain 36 of a motor vehicle (ref. FIG. 5-6), for example. For example, on the radially outer edge of the input part 12, friction linings of the coupling disc 48 can be provided, via which a torque generated by a motor vehicle engine can be introduced. The input part 12 is coupled via a respective first cam mechanism 14 to two intermediate elements 16 designed as pendulum rockers. To form the first cam mechanism 14, the input part 12 and the intermediate element 16 can have suitably designed straight and/or curved tracks or ramps, on which a roller, rolling element or other coupling element can be guided.

Between the two intermediate elements 16, two energy storage elements 18 are provided, which run parallel to one another and are designed as compression springs. In the event of a relative rotation of the input part 12 with respect to the intermediate elements 16 caused by a torsional vibration, the first cam mechanism 14 can convert the relative rotation of the input part 12 into a linear relative displacement of the intermediate elements 16 towards one another or away from one another (as indicated by the vertical arrows in FIG. 7, for example), which results in compression or relaxation of the energy storage elements 16. In other words, the two intermediate elements 16 are movement-coupled to the input part 12 and each linearly movable towards and away from the other in a radial plane of the torsional vibration damper 10. Because there are two cam mechanisms 14, the intermediate elements 16 move linearly towards and away from one another and do not swing relative to one another.

The intermediate elements 16 are coupled to an output part 22 by means of second cam mechanisms 20 which are designed essentially analogously to the first cam mechanisms 14. In the event of a linear movement of the intermediate elements 16, the second cam mechanism 20 can convert the linear movement of the intermediate elements 16 into a relative rotation of the output part 22 with respect to the intermediate elements 16. The output part 22 has a first output disc 24 and a second output disc 26, between which the intermediate elements 16 are arranged. The output part 22 can be connected in a rotationally fixed manner to a hub which, for example, has an internal toothing in order to be able to engage a spline toothing with a transmission input shaft 40 of a motor vehicle transmission.

Axial play between the intermediate elements 16 and the output part 22 can be eliminated by a compensation part 28 preloaded in the axial direction between the intermediate element 16 and the first output disc 24 and/or between the intermediate element 16 and the second output disc 26, thereby preventing the intermediate element 16 from tilting out of a radial plane of the torsional vibration damper 10. In this case, the output part 22 can additionally press against the intermediate part 16 with an axial spring force supported on the output part 22 and exert a frictional force. As a result, the relative movement of the intermediate elements 16 with respect to the output part 22 can be used to provide deliberate frictional damping. To set a defined friction behavior, friction elements 30 are provided between the intermediate elements 16 and the first output disc 24 on the one hand and between the intermediate elements 16 and the second output disc 26 on the other hand.

For example, the friction elements 30 are optionally coupled in a rotationally fixed manner to the output part 22 via the intermediate output part 22, so that the frictional damping can take place on the intermediate element 16 and/or on the compensation part 28 due to a relative rotation of the output part 22 together with the friction linings 30. The compensation part 28 can be coupled to the intermediate part 16 or to the output part 22 in a manner fixed against movement. Alternatively, the friction elements 30 are optionally coupled to the intermediate part 16 in a manner fixed against movement via the intermediate output part 22, so that the frictional damping can take place on the intermediate element 16 and/or on the compensation part 28 due to a relative rotation of the output part 22 together with the friction linings 30.

The compensation part 28 can be coupled to the intermediate part 16 or to the output part 22 in a manner fixed against movement. In the exemplary embodiment shown in FIG. 2, the compensation part 28 is only provided on one axial side of the intermediate element 16, as a result of which the intermediate element 16 is supported on the output part 22 via the interposed friction element 30 on the other axial side without an intermediate compensation part 28. On the axial side of the intermediate element 16 facing the compensation part 28, the compensation part 28 is arranged between the intermediate part 16 and the friction lining 30 supported on the output part 22. However, it is also possible to support the compensation part 28 directly on the output part 22 and to press it against the intermediate element 16 via the friction lining 30.

The friction elements 30 are designed, for example, as separate disc-shaped components. Since the input discs of the input part 12 overlap the output disks 24, 26 of the output part 22 radially on the outside, the intermediate element 16 can also be axially supported by friction against tilting on the input part 12, radially on the outside, via the interposed friction element 30 and/or the compensation part 28.

In the exemplary embodiment of the torsional vibration damper 10a shown in FIG. 3, in comparison to the exemplary embodiment of the torsional vibration damper 10 shown in FIG. 2, the friction elements 30a are designed as sleeves which envelop the intermediate element 16 and, for this purpose, engage around the intermediate element 16 radially on the inside. In addition, the friction element 30a is designed to be elastic and/or resilient in the axial direction, so that the friction elements 30a clamped at least lightly between the output disks 24, 26 also eliminate the axial play of the intermediate element 16 and thereby simultaneously form the output part 22. In comparison to the exemplary embodiment of the torsional vibration damper 10 shown in FIG. 2, the friction elements 30a and the compensation part 28a are not designed as separate components, but rather as a common, integral component.

If the compensation part 28 is designed as a separate component to the friction element 30, the compensation part 28 can be designed, for example, as a plate spring, which is designed to be closed in the circumferential direction. Alternatively, the compensation part 28 can be designed as a corrugated sheet, as shown in FIG. 4, which is provided as a corrugated sheet only in a limited angular range, for example essentially oriented tangentially. Due to the undulating shape, the compensation part 28 can have, for example, two first contact surfaces 32 which face the intermediate element 16, and three second contact surfaces 34 which face the output part 22.

The powertrain 36 of an electrically drivable motor vehicle, for example, a hybrid motor vehicle, partially shown in FIG. 5, has a flywheel 38, via which a torque generated in an electrical machine can be introduced and transmitted to a transmission input shaft 40 of a motor vehicle transmission. In the torque flow between the flywheel 38 and the transmission input shaft 40, a torsional vibration damper 10 is provided, which can be designed and developed as described above.

The friction clutch 42 shown in FIG. 6 for a powertrain 36 of a motor vehicle has a counter plate 44 which can be connected directly or indirectly to a drive shaft of a motor vehicle engine and via which the torque generated by the motor vehicle engine can be introduced. With the aid of a pressure plate 46 that can be displaced axially relative to the counter plate 44, a coupling disc 48, which is connected in a rotationally fixed manner to a transmission input shaft 40, can be compressed in a frictionally locking manner. The coupling disc 48 has a torsional vibration damper 10 which acts as a disc damper and which can be designed and developed as described above.

REFERENCE NUMERALS 10 torsional vibration damper
10a torsional vibration damper
12 input part
14 first cam mechanism
16 intermediate elements
18 energy storage element
20 second cam mechanism
22 output part
24 first output disc
26 second output disc
28 compensation part
28a compensation part
30 friction element
30a friction element
32 first contact surface
34 second contact surface
36 powertrain
38 flywheel
40 transmission input shaft
42 friction clutch
44 counterplate
46 pressure plate
48 coupling disc

The invention claimed is:

1. A torsional vibration damper comprising:
an input part for introducing a torque;
two intermediate elements:
  movement-coupled to the input part; and
  each linearly movable towards and away from the other in a radial plane of the torsional vibration damper;
an energy storage element designed as a compression spring that acts on the intermediate elements;
an output part for discharging a vibration-damped torque:
  movement-coupled to the intermediate elements; and
  rotatable relative to the intermediate elements; and
an elastic or resilient compensation part provided between the output part and the intermediate elements for eliminating play of the intermediate elements relative to the output part in an axial direction.

2. The torsional vibration damper of claim 1, wherein:
the output part comprises:
  a first output disc; and
  a second output disc coupled to the first output disc in a rotationally fixed manner;
the intermediate elements are arranged axially between the first output disc and the second output disc; and
the compensation part is arranged:
  axially between the first output disc and the intermediate elements; or
  axially between the intermediate elements and the second output disc.

3. The torsional vibration damper of claim 1, wherein the compensation part is designed as a plate spring or a corrugated sheet.

4. The torsional vibration damper of claim 1, wherein the compensation part is rotationally fixed to the output part.

5. The torsional vibration damper of claim 1, further comprising a friction element, wherein the compensation part acts indirectly on the intermediate elements or on the output part through the friction element.

6. The torsional vibration damper of claim 1, wherein:
each of the intermediate elements comprises a friction element on an axial side of the intermediate element pointing towards the output part; and
each of the intermediate elements is largely shrouded by the friction element.

7. The torsional vibration damper of claim 6, wherein the friction element is designed as a two-part sleeve covering more than half of both axial sides of the intermediate element.

8. The torsional vibration damper of claim 6, wherein the friction element is designed to be elastic or resilient in the axial direction to form the compensation part.

9. The torsional vibration damper of claim 1, wherein:
the input part comprises a first input disc and a second input disc coupled in a rotationally fixed manner to the first input disc;
the intermediate elements are arranged in the axial direction between the first input disc and the second input disc; and
a first side of the compensation part is supported on one of the intermediate elements; and
a second side of the compensation part, opposite the first side, is supported on the output part and on the input part.

10. The torsional vibration damper of claim 1, wherein:
the intermediate elements are coupled to the input part via a first cam mechanism in such a way that a relative rotation of the input part relative to the intermediate elements is convertible into a linear movement of the intermediate elements towards one another or away from one another; and
the output part is coupled to the intermediate elements via a second cam gear such that a relative linear movement of the intermediate elements with respect to one another is convertible into a rotary movement of the output part relative to the intermediate elements.

* * * * *